(12) United States Patent
Iwaki et al.

(10) Patent No.: US 7,762,094 B2
(45) Date of Patent: Jul. 27, 2010

(54) VALVE CONTROL SYSTEM, VALVE CONTROL APPARATUS AND VALVE CONTROL METHOD

(75) Inventors: Izumi Iwaki, Tokyo (JP); Yoshio Ogawa, Tokyo (JP)

(73) Assignee: Fujkoki Corporation, Tokyo (JP)

( * ) Notice: Subject to any disclaimer, the term of this patent is extended or adjusted under 35 U.S.C. 154(b) by 396 days.

(21) Appl. No.: 11/378,044

(22) Filed: Mar. 17, 2006

(65) Prior Publication Data

US 2006/0213208 A1    Sep. 28, 2006

(30) Foreign Application Priority Data

Mar. 22, 2005    (JP)    ............... 2005-082129

(51) Int. Cl.
    *F25B 41/04*    (2006.01)
    *F16K 31/02*    (2006.01)
(52) U.S. Cl. .................... 62/225; 251/129.05
(58) Field of Classification Search .......... 62/222, 62/224, 225; 251/129.05
See application file for complete search history.

(56) References Cited

U.S. PATENT DOCUMENTS

| | | | | | |
|---|---|---|---|---|---|
| 4,253,480 | A | * | 3/1981 | Kessel et al. | 137/102 |
| 4,651,535 | A | * | 3/1987 | Alsenz | 62/225 |
| 4,829,777 | A | * | 5/1989 | Matsuoka et al. | 62/212 |
| 5,771,703 | A | * | 6/1998 | Rajendran | 62/204 |

FOREIGN PATENT DOCUMENTS

| | | |
|---|---|---|
| DE | 37 39 980 A1 | 5/1988 |
| DE | 195 06 143 A1 | 9/1996 |
| GB | 2 203 865 A | 10/1998 |
| JP | 56-44569 | 4/1981 |
| JP | S58-24771 A | 2/1983 |
| JP | 6-86961 | 11/1994 |
| JP | H09-096452 | 4/1997 |

OTHER PUBLICATIONS

European Search Report for Application No. 06000983.4; Jan. 26, 2010.
Japan Patent Office, "Notification of Reasons for Refusal", Feb. 24, 2010.

* cited by examiner

*Primary Examiner*—Marc E Norman
(74) *Attorney, Agent, or Firm*—Howard & Howard Attorneys PLLC (57) ABSTRACT

In a refrigeration cycle system, temperature sensors measure the temperatures Tin and Tout of a refrigerant at the entrance and exit of an evaporator. A control circuit performs PID calculation based on signals from the temperature sensors in order to control a degree of superheat corresponding to the difference between the temperatures Tin and Tout at the entrance and exit to an aimed value, and calculates an operation amount for the opening degree of an expansion valve. In a case where the operation amount exceeds the limit of realizable velocity of driving an actuator that actuates the expansion valve, the control circuit performs a limiter process for limiting the operation amount so as not to exceed the limit value. The control circuit drives the actuator by using the operation amount after subjected to the limiter process, thereby to stably control the opening degree of the expansion valve.

5 Claims, 6 Drawing Sheets

VALVE CONTROL SYSTEM, VALVE CONTROL APPARATUS AND VALVE CONTROL METHOD

BACKGROUND OF THE INVENTION

1. Field of the Invention

The present invention relates to a technique for controlling opening and closing of a valve, and particularly relates to a valve control system, a valve control apparatus, and a valve control method for controlling opening and closing of a valve with the use of an actuator such as a pulse motor, etc.

2. Description of the Related Art

Electrically-driven valves are used for various purposes. For example, a temperature-sensitive expansion valve (thermal expansion valve) is used for controlling the flow rate of a refrigerant in Unexamined Japanese Patent Application KOKAI Publication No. S56-44569.

Further, an improved method for driving the temperature-sensitive expansion valve disclosed in Unexamined Japanese Patent Application KOKAI Publication No. S56-44569 is disclosed in Examined Japanese Patent Application KOKOKU Publication No. H6-86961.

The driving method disclosed in Examined Japanese Patent Application KOKOKU Publication No. H6-86961 is an improvement for PID (Proportional Integral Differential) control. According to this driving method, the opening degree of an electrically-driven expansion valve is controlled in accordance with the sum of a first electric signal which is the product of an electric signal indicative of a temperature difference between a degree of superheat of a refrigerant at the exit of an evaporator and an aimed degree of superheat and a first proportionality constant, a second electric signal which is the product of an electric signal indicative of a value obtained by integrating that temperature difference with respect to time and a second proportionality constant, and a third electric signal which is the product of an electric signal indicative of a value obtained by differentiating that temperature difference with respect to time and a third proportionality constant. This driving method can achieve a better control on the degree of superheat than in a case where a temperature-sensitive expansion valve is used.

SUMMARY OF THE INVENTION

Generally, opening or closing of an electrically-driven valve is performed with the use of an actuator such as a pulse motor, etc. Actuators have driving limits due to their response characteristics.

Because of this, the operation amount (velocity of opening or closing the valve) obtained by computation might be larger than the driving limit of an actuator. In this case, the operation amount obtained by computation and the actual operation amount do not coincide, and continued coincidence failure will enlarge the difference between the computational current opening degree and the actual opening degree to finally run out of control.

The present invention was made in view of the above circumstance, and an object of the present invention is to provide a valve control system, a valve control apparatus, and a valve control method capable of stably controlling the opening degree of a valve.

To achieve the above object, a valve control system according to a first aspect of the present invention comprises:

a sensor which detects a control amount;

a control unit which calculates a variation between the control amount and an aimed value for the control amount based on an output of the sensor, calculates an operation amount for actuating a valve as a control object based on the calculated variation, corrects the calculated operation amount to a predetermined value equal to or smaller than a predetermined limit value in a case where the operation amount exceeds the limit value, and outputs the calculated operation amount or the corrected operation amount; and an actuator which controls an opening degree of the valve as the control object in accordance with the operation amount output from the control unit.

According to this structure, since the operation amount is corrected to within the driving capability of the actuator, the operation amount obtained by calculation and the actual operation amount coincide, and so do the current valve opening degree obtained by calculation and the actual valve opening degree. Therefore, the actuator less easily runs out of control, and can be appropriately driven.

The valve control system may comprise a refrigeration cycle which is connected to an expansion valve comprising the control object valve, and which includes an evaporator through which a refrigerant circulates.

The sensor may include a first detector which outputs a signal corresponding to a temperature of the refrigerant at an entrance of the evaporator, and a second detector which outputs a signal corresponding to a temperature of the refrigerant at an exit of the evaporator.

The control unit may comprise a unit which calculates a temperature difference between the temperatures of the refrigerant at the entrance and exit of the evaporator based on the signals from the first and second detectors, calculates a variation between the temperature difference and a set degree of superheat as an aimed value for the temperature difference, calculates an operation amount of the actuator based on the variation, corrects the calculated operation amount to equal to or smaller than a limit value which is equal to or smaller than a maximum operation capability amount representing a maximum amount by which the actuator can be operated in a predetermined period of time in a case where the operation amount is larger than the limit value, and outputs a signal corresponding to the corrected operation amount to the actuator.

For example, the control unit periodically calculates the variation between the control amount and the aimed value for the control amount, periodically calculates the operation amount of the actuator based on the variation, and limits the operation amount to a predetermined value equal to or smaller than a maximum amount by which the actuator can be operated in one period, in a case where the operation amount is lager than the maximum amount.

For example, the actuator comprises a pulse motor.

The control unit calculates a number of pulses as pulse signals to be supplied to the pulse motor based on the variation, and limits the number of pulses to be supplied to a predetermined value equal to or smaller than a maximum number of pulses that can be responded to by the pulse motor in one period, in a case where the number of pulses to be supplied is larger than the maximum number of pulses.

To achieve the above object, a valve control method according to a second aspect of the present invention comprises:

a step of detecting a control amount;

a step of calculating a variation between the control amount and an aimed value for the control amount based on the detected control amount, and calculating an operation amount of an actuator for controlling an opening degree of a valve based on the calculated variation;

a step of subjecting the calculated operation amount to a limiter process for adjusting the operation amount so as not to exceed a predetermined limit value; and a step of controlling the opening degree of the valve by driving the actuator based on the operation amount subjected to the limiter process.

To achieve the above object, a valve control apparatus according to a third aspect of the present invention comprises:

a valve which is a control object;

an actuator which is driven in accordance with a drive signal to change an opening degree of the valve as the control object; and a control unit which calculates a variation between a control amount of a fluid flowing through the valve as the control object and an aimed value for the control amount based on an output from a sensor which detects the control amount of the fluid, calculates an operation amount for actuating the valve as the control object based on the calculated variation, adjusts the operation amount so as not to exceed a predetermined limit value, and outputs a drive signal corresponding to the adjusted operation amount to the actuator.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A refrigeration cycle system having a refrigerant flow rate control apparatus according to an embodiment of the present invention will now be explained with reference to FIG. 1 and FIG. 2.

Figure 1:
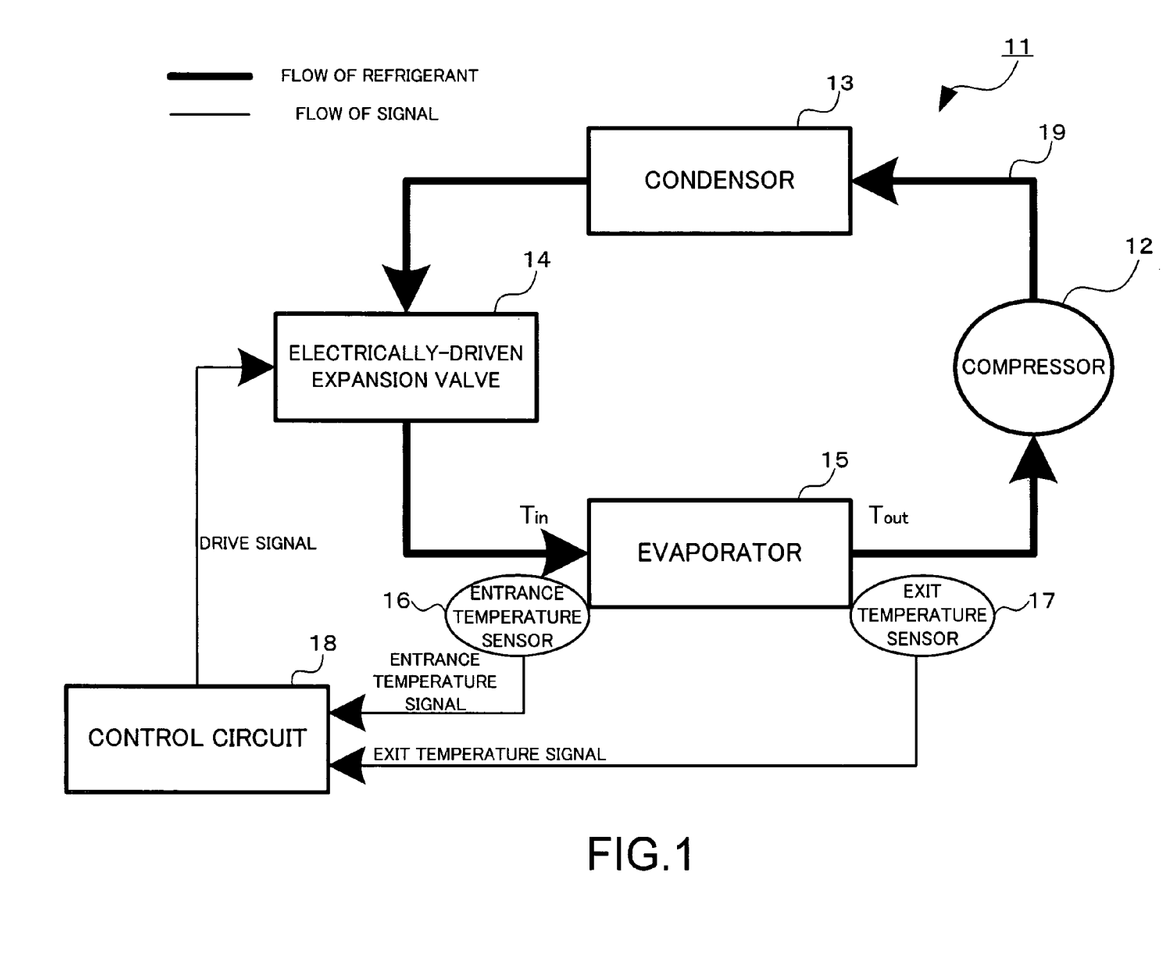
FIG. 1 is a block diagram of a refrigeration cycle system according to one embodiment of the present invention.

The present refrigeration cycle system 11 comprises a compressor 12, a condenser 13, an electrically-driven expansion valve (hereinafter referred to simply as expansion valve) 14, an evaporator 15, an entrance temperature sensor 16, an exit temperature sensor 17, and a control circuit 18, as shown in FIG. 1.

The compressor 12, the condenser 13, the expansion valve 14, and the evaporator 15 are connected by a duct 19 for a refrigerant to circulate therethrough. The flow rate of the refrigerant flowing through the duct 19 is controlled by adjusting the opening degree of the expansion valve 14.

The compressor 12 compresses the refrigerant in a gaseous state under a low pressure which is entered from the flow entrance to change it into a high-pressured gas, and supplies it to the condenser 13 through the duct 19.

The condenser 13 condenses the refrigerant in the high-pressured gaseous state supplied from the compressor 12 to change it into a refrigerant in a high-pressured liquid state while taking away the heat of condensation from it, and discharges the taken heat.

The expansion valve 14 is an electrically-driven valve whose opening degree is set by an electric signal. The expansion valve 14 has a built-in pulse motor which is driven in accordance with a drive signal from the control circuit 18. By the pulse motor being rotated in accordance with a pulse signal supplied from the outside, the opening degree of the expansion valve 14 is adjusted. The refrigerant that has passed through the expansion valve 14 has changed from the high pressured state into a low pressured state.

The evaporator 15 evaporates (vaporizes) the refrigerant in the low-pressured liquid state. At this time, the refrigerant takes away the heat of vaporization from the ambience and gets heated.

The entrance temperature sensor 16 is located at the entrance of the evaporator 15 to detect the temperature Tin of the refrigerant at the entrance of the evaporator 15, i.e., the refrigerant in the liquid state and supply an electric signal (entrance temperature signal) corresponding to the detected temperature to the control circuit 18. As shown in FIG. 2, the entrance temperature sensor 16 comprises a thermistor 161 having a negative temperature-resistance characteristic and a resistance-voltage conversion circuit 162 which converts the resistance value of the thermistor 161 to a direct-current (DC) voltage signal and supplies it to a microprocessor 181 constituting the control circuit 18.

The exit temperature sensor 17 is located at the exit of the evaporator 15, detects the temperature Tout of the refrigerant at the exit of the evaporator 15, i.e., the refrigerant in the gaseous state, and supplies an electric signal (exit temperature signal) corresponding to the detected temperature to the control circuit 18. As shown in FIG. 2, the exit temperature sensor 17 comprises a thermistor 171 having a negative temperature-resistance characteristic, and a resistance-voltage conversion circuit 172 which converts the resistance value of the thermistor 171 to a DC voltage signal and supplies it to the microprocessor 181 constituting the control circuit 18.

The control circuit 18 acquires the detected signals from the entrance temperature sensor 16 and exit temperature sensor 17, and calculates a degree of superheat Tsh (the temperature Tout detected by the exit temperature sensor 17—the temperature Tin detected by the entrance temperature sensor 16) of the refrigerant at the evaporator 15. The control circuit 18 calculates the aimed value for the opening degree of the expansion valve 14 by so-called PID control based on the degree of superheat Tsh. The control circuit 18 generates such a drive signal for controlling the opening degree of the expansion valve 14 as would achieve the calculated aimed value for the opening degree, and supplies it to the pulse motor.

Figure 2:
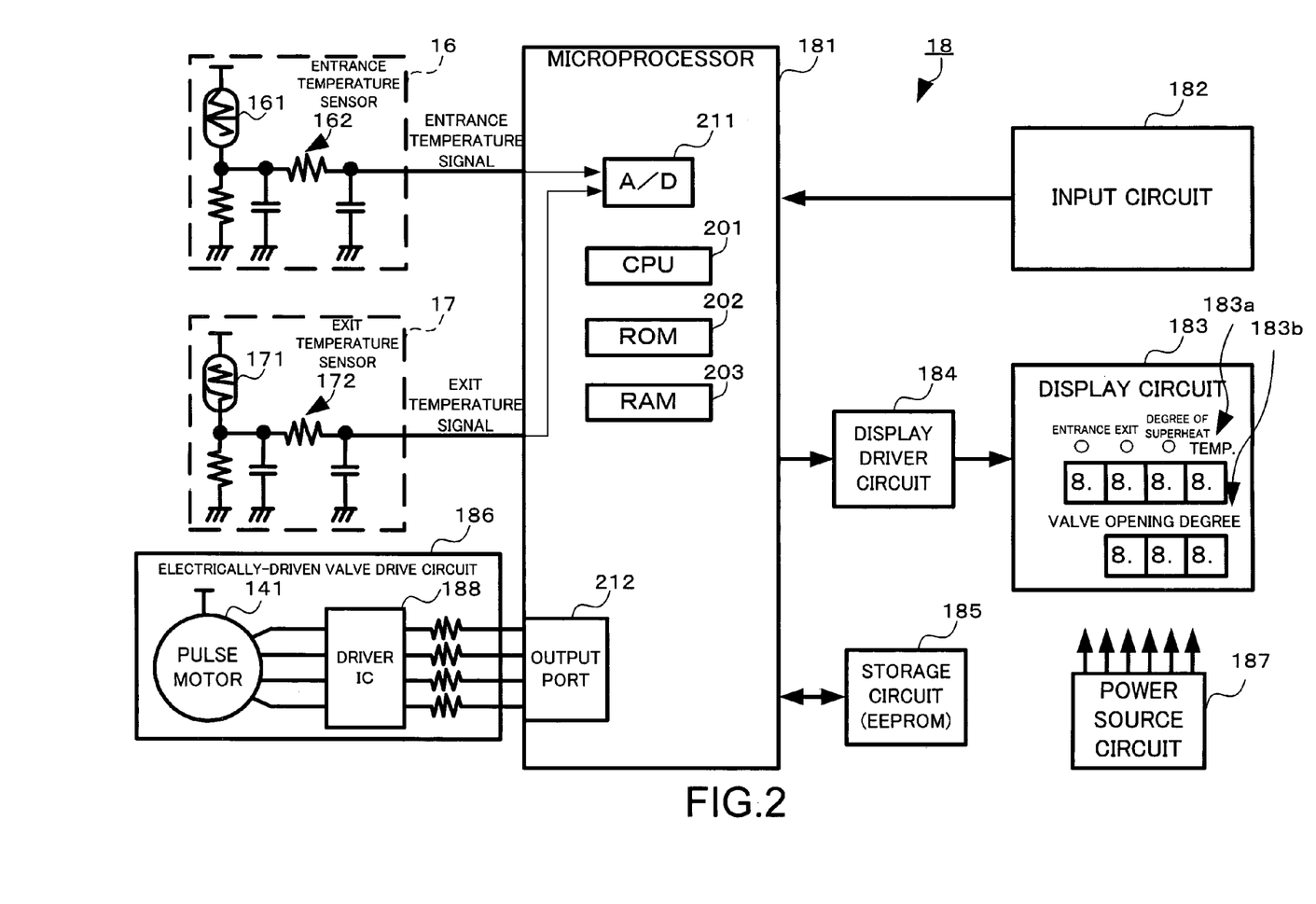
FIG. 2 is a diagram showing an example of the specific structure of a control circuit and its peripheral circuits shown in FIG. 1.

As shown in FIG. 2, the control circuit 18 comprises a microprocessor 181, an input circuit 182, a display circuit 183, a display driver circuit 184, a storage circuit 185, an electrically-driven valve drive circuit 186, and a power source circuit 187.

The input circuit 182 comprises a plurality of tact switches and dip switches. The input circuit 182 inputs various information into the microprocessor 181 in accordance with the settings of the tact switches and dip switches. The input circuit 182 inputs various aimed temperatures (for example, an aimed value for the degree of superheat Tsh of the evaporator 15), the full opening degree (herein, the number of drive pulses (phase switch signals) to be supplied to the later-described pulse motor 141 for changing the expansion valve 14 from its fully-opened state to its fully-closed state) of the expansion valve 14, a later-described limiter value (later-described Vmax), etc.

The display circuit 183 includes a temperature display element 183a and a valve opening degree display element 183b. The temperature display element 183a alternately displays the temperature Tin and temperature Tout of the refrigerant at the entrance and exit of the evaporator 15 and the degree of superheat Tsh (=Tout−Tin). The valve opening degree display element 183b displays the opening degree of the expansion valve 14 in the form of the number of pulses needed to achieve that opening degree as counted from the fully-closed state.

The display driver circuit 184 drives the display circuit 183 based on a display control signal from the microprocessor 181 to let it timely display the temperatures and opening degree.

The storage circuit 185 stores the aimed values for backup purposes.

The electrically-driven valve drive circuit 186 comprises the pulse motor (stepping motor) 141 built in the expansion valve 14 and a driver IC (Integrated Circuit) (drive signal amplifying circuit) 188.

The driver IC 188 supplies a drive pulse to the pulse motor 141 in accordance with a drive control signal from the microprocessor 181.

The microprocessor 181 comprises a CPU (Central Processing Unit) 201, a ROM (Read Only Memory) 202, and a RAM (Random Access Memory).

The CPU 201 interpretively executes a program stored in the ROM 202. Particularly, according to the present embodiment, the CPU 201 executes PID control calculation in a manner that the difference Tsh (=degree of superheat) between the temperature Tin detected by the entrance temperature sensor 16 and the temperature Tout detected by the exit temperature sensor 17 will coincide with the aimed temperature input from the input circuit 182. The CPU 201 controls the pulse motor 141 via the driver IC 188 based on the calculation result to control the opening degree of the expansion valve 14. Note that in a case where the absolute value of an operation amount Vm obtained from the PID calculation exceeds a limit value Vmax of the operation velocity of the pulse motor 141, the CPU 201 executes control by setting the absolute value of the operation amount Vm to the limit value Vmax.

The ROM 202 is a non-volatile memory for storing an operation program for executing the PID control operation to be described later with reference to FIG. 3 and FIG. 4, a display control program, etc. The RAM 203 serves as the work memory for the CPU 201, and memorizes various data, for example, an aimed value V0 for the valve opening degree obtained as a result of the later-described process shown in FIG. 3 and the valve opening degree V at present.

The microprocessor 181 has a plurality of input ports. An analog entrance temperature signal output from the entrance temperature sensor 16, and an analog exit temperature signal output from the exit temperature sensor 17 are supplied from these input ports. To be supplied with these signals, the microprocessor 181 converts the signals into digital signals at an A/D converter 211 thereof.

The microprocessor 181 has an output port 212 from which a drive signal is supplied to the electrically-driven valve drive circuit 186.

The power source circuit 187 supplies operation power to each component.

Next, the operation of the refrigeration cycle system 11 having the above-described structure will be explained.

The compressor 12 compresses a low-pressured gaseous refrigerant entered from the flow entrance to change it into a high-pressured gas, and supplies it to the condenser 13. The condenser 13 condenses the refrigerant in the high-pressured gaseous state supplied from the compressor 12 to change it into a refrigerant in a high-pressured liquid state, takes away the heat of condensation, and discharges the taken heat. This heat is utilized for heating purposes including air heating in accordance with necessity, or otherwise wasted. The expansion valve 14 adjusts its opening degree in accordance with a drive signal from the control circuit 18 to adjust the flow rate of the refrigerant. The refrigerant that has passed through the expansion valve 14 has changed from the high-pressured state into a low-pressured state. The evaporator 15 evaporates (vaporizes) the refrigerant in the low-pressured liquid state. At this time, the refrigerant takes away the heat of vaporization from the ambience to get heated. The ambience gets cooled due to the heat taken away. This operation is repeated and heat is continuously or intermittently taken away at the evaporator 15, thereby a refrigerated state is established.

Next, a control operation performed by the control circuit 18 for maintaining the temperature of refrigeration obtained by the refrigeration cycle system 11 to a desired level will be explained, by describing mainly the operation of the microprocessor 181 constituting the principal part of the control circuit 18.

The microprocessor 181 is supplied from the input circuit 182 with a limit value Vmax for the operation velocity of the pulse motor 141, that matches the specification of the pulse motor 141 used, and the supplied limit value Vmax is stored in the RAM 203, etc. In a case where, for example, the microprocessor 181 performs the control of driving the pulse motor 141 by acquiring the detected temperatures from the temperature sensors 16 and 17 for every predetermined period, the limit value Vmax is the maximum number of pulses that can be responded to by the pulse motor 141 in one period.

Figure 3:
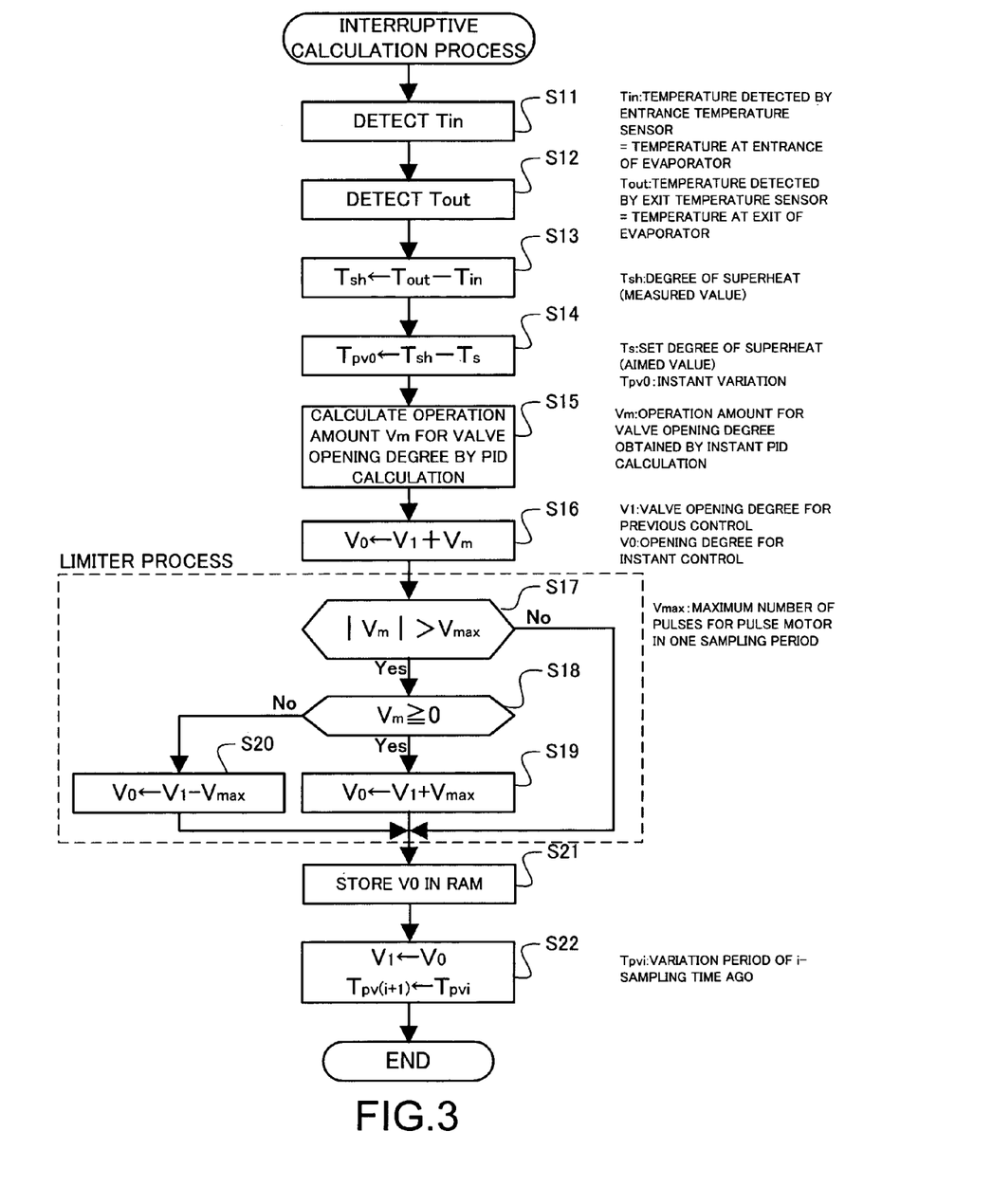
FIG. 3 is a flowchart for explaining an interruptive calculation process performed by a microprocessor shown in FIG. 2.

During the control operation, the microprocessor 181 starts an interruptive process (PID calculation process) shown in FIG. 3 at predetermined regular intervals, for example, at intervals of 0.1 second, in accordance with internal timer interruption or the like.

First, the CPU 201 of the microprocessor 181 acquires an entrance temperature signal output from the entrance temperature sensor 16 via the A/D converter 211, and stores the acquired data in the RAM 203 (step S11). Assuming that the interruption interval is 0.1 second, the sampling period during which the temperature Tin at the entrance of the evaporator 15 is sampled is also 0.1 second.

Next, the CPU 201 switches the input to the A/D converter 211 from the entrance temperature signal input port to the exit temperature signal input port, and acquires an exit temperature signal output from the exit temperature sensor 17 via the A/D converter 211. The CPU 201 stores the acquired data in the RAM 203 (step S12). In case of the interruption interval being 0.1 second, the sampling period for the temperature Tout at the exit of the evaporator 15 is also 0.1 second.

Next, the CPU 201 calculates the current degree of superheat Tsh=Tout−Tin, and stores the obtained degree of superheat Tsh in the RAM 203 (step S13).

Then, the CPU 201 calculates the variation Tpv0=Tsh−Ts of the current degree of superheat Tsh (step S14). Here, Ts is a set value (aimed value) for the degree of overheat.

Next, the CPU 201 calculates the operation amount Vm for the valve opening degree for the instant control operation, by PID (Proportional Integral Differential) calculation according to the following equation, based on the sequence of past variations Tpv, integral time I, and derivative time D (step S15).

$$Vm = P \cdot Tpv0 + k1 \cdot \int Tpv\, dt + (k2 \cdot d\, Tpv/dt)$$

where P: proportional band (coefficient), k1: coefficient for integration value, k2: coefficient for derivative value.

To be more specific, in case the integral time is I and the derivative time is D, the CPU 201 extracts variations Tpv0, Tpv1, Tpv2, . . . , Tpvn in the nearest preceding period of time I and also a variation Tpvk a period of time D ago, from the sequence of variations accumulated in the RAM 203.

Then, the CPU 201 calculates the integration value ΣTpv=Tpv0+Tpv1+Tpv2+ . . . +Tpvn.

Then, the CPU 201 calculates the derivative value d Tpv/dt=(Tpv0−Tpvk)/D. Then, the CPU 201 calculates the operation amount Vm in accordance with the following equation.

$$Vm = P \cdot Tpv0 + k1 \cdot \Sigma Tpv + k2 \cdot (Tpv0 - Tpvk)/D$$

That is, the CPU 201 calculates the number of pulses (number of steps) to be supplied to the pulse motor 141 by the next interruption timing.

Then, the CPU 201 calculates a value V0=V1+Vm, which is an aimed value for the valve opening degree for the instant control operation, and which is the sum of the operation amount Vm for the valve opening degree obtained in the instant PID calculation and the previous valve opening degree (the aimed value for the valve opening degree obtained in the previous interruption process=the current position of the valve) V1 (step S16).

If the absolute value of the operation amount (drive amount) Vm is larger than the maximum drive velocity Vmax of the pulse motor 141, the pulse motor 141 cannot follow, and the controlled state of the valve opening will be disordered. Hence, if this case occurs, the aimed value V0 is corrected so that the operation amount Vm will become such a value as can be followed by the pulse motor 141. That is, a limiter process is performed in which the operation amount Vm is limited to a value followable by the pulse motor 141 as actuator.

First, the CPU 201 reads the maximum change amount (the maximum number of pulses that can be responded to) Vmax of the pulse motor 141 per sampling period, from the RAM 203. Next, the CPU 201 determines whether the absolute value |Vm| of the operation amount is larger or not than the maximum change amount Vmax of the pulse motor 141 per sampling period (step S17). In a case where the absolute value |Vm| of the operation amount is equal to or smaller than the maximum change amount Vmax of the pulse motor 141 per sampling period (step S17; No), the valve opening degree can be changed to the aimed value V0 by the next interruption process. Thus, in this case, the CPU 201 stores the aimed value V0 for the valve opening degree, which is based on the operation amount Vm obtained in the instant PID calculation, in the RAM 203 with no change added, as the aimed value for the valve opening degree for the instant control operation (step S21).

On the contrary, in a case where the absolute value |Vm| of the operation amount is larger than the maximum change amount Vmax of the pulse motor 141 per sampling period (step S17; Yes), the expansion valve 14 cannot be changed to the aimed value V0 obtained by the PID calculation by the next sampling interruption process. Accordingly, if the aimed value V0 obtained in step S16 were output with no change added as the valve opening degree V0 for the instant control operation, the control would be unstable. Therefore, in this case, the CPU 201 corrects the aimed value V0 for the valve opening degree to a value that can be followed by the pulse motor 141, i.e., to a value that allows |Vm| to be equal to or lower than Vmax.

To be more specific, the CPU 201 first determines whether or not it is Vm≧0 (step S18). That is, the CPU 201 determines whether the valve is to be controlled in the opening direction or in the closing direction.

If it is Vm≧0 (step S18; Yes), the CPU 201 sets V0 to "V1+Vmax" (step S19). On the contrary, if it is Vm<0 (step S18; No), the CPU 201 sets V0 to "V1−Vmax" (step S20).

In this way, the aimed value V0, which is the corrected valve opening degree which the expansion valve 14 should reach by the next sampling timing, is set. Next, the CPU 201 stores the corrected aimed value V0 in the RAM 203 (step S21).

CPU 201 supplies a drive signal to the pulse motor 141 from the output port 212 via the driver IC 188 to control the expansion valve 14, so that the valve opening degree of the expansion valve 14 will be the aimed value V0 stored in the RAM 203.

Next, the CPU 201 updates the internally stored value V0 to V1, and a variation Tpvi a period of an i-sampling time ago to a variation Tpv(i+1) (i being 0 or a positive integer) a period of an (i+1) sampling time ago, (that is, the CPU 201 sequentially updates Tpvi to Tpv(i+1), Tpv(i−1) to Tpvi, . . . , Tpv1 to Tpv2, and Tpv0 to Tpv1) for the next timer interruption process (step S22).

The instant time interruption process (interruptive calculation process) is completed as of this.

Figure 4:
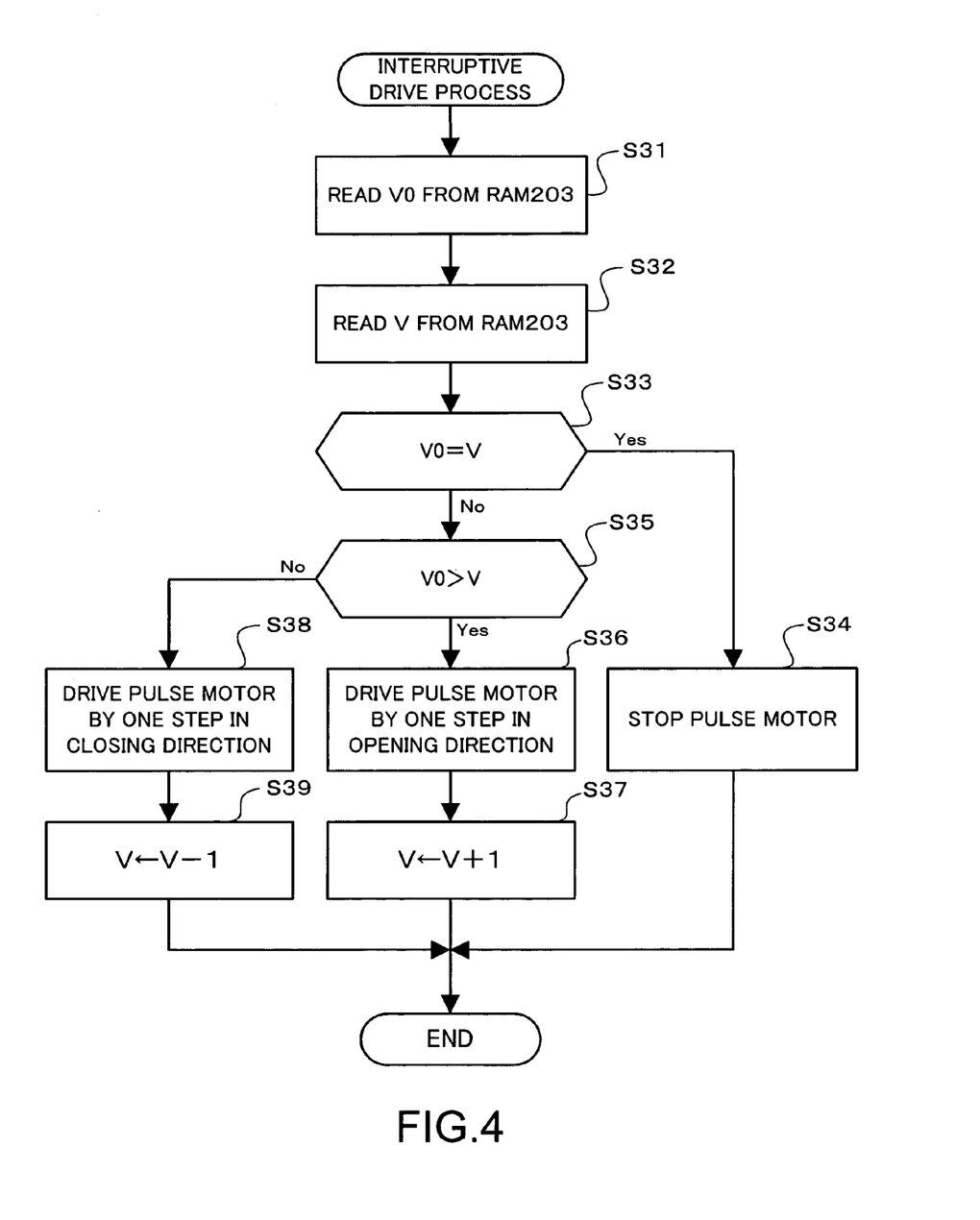
FIG. 4 is a flowchart for explaining an interruptive drive process performed by the microprocessor shown in FIG. 2.

FIG. 4 specifically shows a process performed by the microprocessor 181 to output a drive signal for controlling the pulse motor 141 on the basis of one step per predetermined period of time, so that the valve opening degree of the expansion valve 14 will be the aimed value V0 obtained according to FIG. 3.

During the control operation, the microprocessor 181 performs an interruptive drive process shown in FIG. 4 at predetermined regular intervals, for example, at the intervals of 16 ms in accordance with an internal timer interruption or the like. The interruptive drive process shown in FIG. 4 is performed within the cycle of the interruptive calculation process shown in FIG. 3 (between the interruptive calculation process of FIG. 3 for the previous occasion and the interruptive calculation process of FIG. 3 for the instant occasion).

First, the CPU 201 of the microprocessor 181 reads the aimed value V0 for the valve opening degree for the instant occasion that has been stored in the RAM 203 in step S21 of FIG. 3 (step S31), and reads the current valve opening degree V of the expansion valve 14 stored in the RAM 203 (step S32). Next, the CPU 201 determines whether it is V0=V (step S33). If it is V0=V (step S33; Yes), which means that the current valve opening degree V coincides with the aimed value V0, the CPU 201 turns off the drive pulse and stops the pulse motor 141 to end the process (step S34).

If determining in step S33 that it is V0≠V (step S33; No), the CPU 201 determines whether it is V0>V (step S35). If determining that it is V0>V (step S35; Yes), the CPU 201 supplies a drive signal to the pulse motor 141 to advance it by one step in the opening direction (step S36). Then, the CPU 201 rewrites the current valve opening degree V to V+1 (step S37) and ends the process.

On the contrary, in a case where determining in step S35 that it is V0<V (step S35; No), the CPU 201 supplies a drive signal to the pulse motor 141 and return the pulse motor 141 by one step in the closing direction (step S38). The CPU 201 rewrites the current valve opening degree V of the expansion valve 14 to V−1 (step S39) and ends the process.

After this, the microprocessor 181 repeats the interruptive process of FIG. 4 at the intervals of 16 ms. This causes the pulse motor 141 to rotate one step by one. And when the current valve opening degree V becomes equal to the aimed value V0 for the valve opening degree for the instant occasion (V0=V: step S33; Yes), the pulse motor 141 is stopped (step S34).

Furthermore, the microprocessor 181 timely performs other interruptive processes including processes upon receiving various inputs from the input circuit 182 and processes for displaying the current temperature or valve opening degree on the display circuit 183 via the display driver circuit 184.

Next, the content of the limiter process will be explained based on a specific example.

Assuming, for example, that the interruption cycle of the interruptive calculation process (FIG. 3) of the microprocessor 181 is 0.1 second and the maximum rotation velocity of the pulse motor 141 is 60 pps, the microprocessor 181 can displace the pulse motor 141, i.e., the expansion valve 14 by only "6" pulses at the maximum in one interruption period. That is, in this case, the maximum change amount Vmax is "6".

Here, a case will be explained where the aimed value V0 obtained in step S16 of FIG. 3 is 180 pulses (this will open (or close) the valve by an amount of 180 pulses as measured from the fully-closed (or fully-opened) state achieved at 0 pulse), and the aimed value V1 one interruption period before is 175 pulses. In this case, the operation amount Vm is "5" (step S15). Therefore, the absolute value |Vm| of the operation amount Vm is determined to be smaller than the maximum change amount Vmax ("6") (step S17; No). Accordingly, the aimed value V0=180 is adopted with no change added as the aimed value for the valve opening degree for the succeeding interruptive drive process and stored in the RAM 203 (step S21). Then, the interruptive drive process of FIG. 4 is periodically performed until the next interruptive calculation process is performed, so that the pulse motor 141 will be driven in the opening (closing) direction by 5 pulses that corresponds to the operation amount Vm and the opening degree of the expansion valve 14 will be 180 pulses.

Next, a case will be explained where the aimed value V0 obtained by the control calculation in step S16 is 180 pulses and the aimed value V1 one interruption period before is 183 pulses. In this case, since the operation amount Vm is "-3" (step S15), the absolute value |Vm| thereof is determined to be smaller than the maximum change amount Vmax ("6") (step S17; No). Accordingly, the aimed value V0=180 is adopted with no change added as the aimed value for the valve opening degree for the succeeding interruptive drive process and stored in the RAM 203 (step S21). The interruptive drive process of FIG. 4 is periodically performed until the next interruptive calculation process is performed, and the pulse motor 141 is driven in the closing (opening) direction by 3 pulses that corresponds to the operation amount Vm to put the expansion valve 14 at the valve opening degree of 180 pulses.

In a case where the aimed value V0 obtained by the control calculation in step S16 is 180 pulses and the aimed value V1 one interruption period before is 170 pulses, the operation amount Vm is "10" (step S15). Accordingly, the absolute value |Vm| of the operation amount Vm is determined to be larger than the maximum change amount Vmax (step S17; Yes). In this case, with the use of Vmax instead of Vm, a value V1+Vmax=170+6=176 since it being Vm≧0 (step S18; Yes), is set as the aimed value V0 for the valve opening degree for the succeeding interruptive drive process (step S19), and is stored in the RAM 203 (step S21). Then, the interruptive drive process of FIG. 4 is periodically performed until the next interruptive calculation process is performed, and the pulse motor 141 is driven in the opening (closing) direction by 6 pulses to put the expansion valve 14 at the opening degree of 176 pulses.

In a case where the aimed value V0 obtained by the control calculation in step S16 is 160 pulses and the aimed value V1 one interruption period before is 170 pulses, the operation amount Vm is "-10" (step S15). Accordingly, the absolute value |Vm| of the operation amount Vm is "10", which is determined to be larger than the maximum change amount Vmax (step S17; Yes). In this case, with the use of Vmax instead of Vm, a value V1−Vmax=170−6=164 since it being Vm<0 (step S18; No), is set as the aimed value V0 for the valve opening degree for the succeeding interruptive drive process (step S20), and is stored in the RAM 203 (step S21). Then, the interruptive drive process of FIG. 4 is periodically performed until the next interruptive calculation process is performed, and the pulse motor 141 is driven in the closing (opening) direction by 6 pulses to put the expansion valve at the opening degree of 164 pulses.

As explained above, according to the present embodiment, the degree of superheat Tsh as a control amount is calculated based on the temperatures detected by the entrance temperature sensor 16 and exit temperature sensor 17, and the variation Tpv between the calculated degree of superheat Tsh and the aimed value for the degree of superheat is calculated. Then, the number of steps Vm as the operation amount of the pulse motor 141 as the actuator is calculated by PID calculation using the variation Tpv. In a case where the absolute value |Vm| of the calculated operation amount Vm exceeds the predetermined limit value (the maximum number Vmax of pulses that can be responded to by the pulse motor 141 in one sampling period), the operation amount Vm is corrected to a value equal to or smaller than the limit value, and the pulse motor 141 is driven at the corrected operation amount to control the opening degree of the expansion valve 14. Accordingly, the pulse motor 141 can always follow the control of the microprocessor 181, and the expansion valve 14 can therefore be controlled stably.

The present invention is not limited to the above-described embodiment, but can be modified or applied in various manners.

For example, in the above-described embodiment, a case where the object of control is controlled by PID manner, has been explained as an example. However, the control manner may be P (Proportional) control or PI (Proportional Integral) control. That is, the present invention can widely be applied to the purposes of stably controlling a control object by controlling the actuator within its driving limit in a case where the operation amount (|Vm|) obtained by calculation according to an arbitrary control manner exceeds the driving limit (maximum velocity) of the actuator.

Further, in the above-described embodiment, the pulse motor is illustrated as the actuator. However, the type of actuator is arbitrary. For example, a coil, a solenoid, a servomotor, etc. may be used.

The present invention is particularly effective for a type of control where the opening degree of a valve as a control object is actually measured but the obtained measured value is not used for the control calculation. However, the present invention is also applicable to the case where the opening degree of a valve is actually measured and the obtained measured value is used for the calculation.

In the above-described embodiment, the present invention has been explained by employing a refrigeration cycle system as an example. However, the control object is arbitrary. Furthermore, the present invention is also applicable to an apparatus of a type that controls its movable component other than a valve, by using an actuator.

Figure 5:
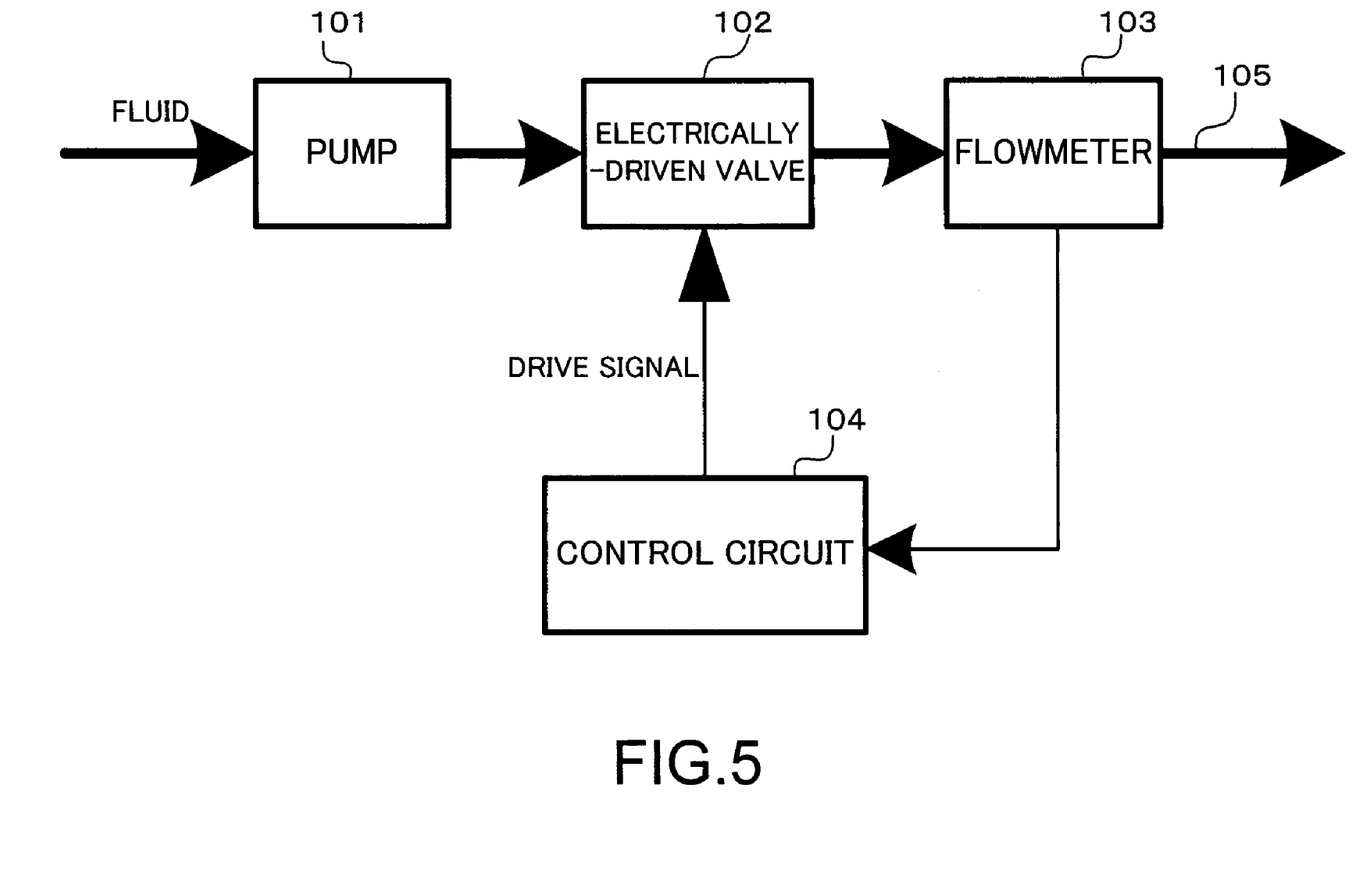
FIG. 5 is a block diagram of a flow rate control circuit according to another embodiment of the present invention.

For example, the present invention is applicable to controlling an arbitrary flow rate. For example, the present invention is applicable to a case where, as shown in FIG. 5, a fluid (liquid, gas, pulverulent body, etc.) is circulated through a duct 105 by a pump 101 or the like while the flow rate of the fluid is controlled by an electrically-driven valve 102. In this case, for example, a flowmeter 103 measures the flow rate of the duct 105, and a control circuit 104 calculates the operation amount of the electrically-driven valve 102 based on the measured flow rate and controls the opening degree of the electrically-driven valve 102 in accordance with the calculated operation amount. Then, in a case where the operation amount obtained by the control calculation exceeds the limit value of the drive velocity for the electrically-driven valve 102, the control circuit 104 controls the opening degree of the electrically-driven valve 102 by correcting the obtained operation amount so that the drive velocity will be equal to or smaller than the limit value.

Figure 6:
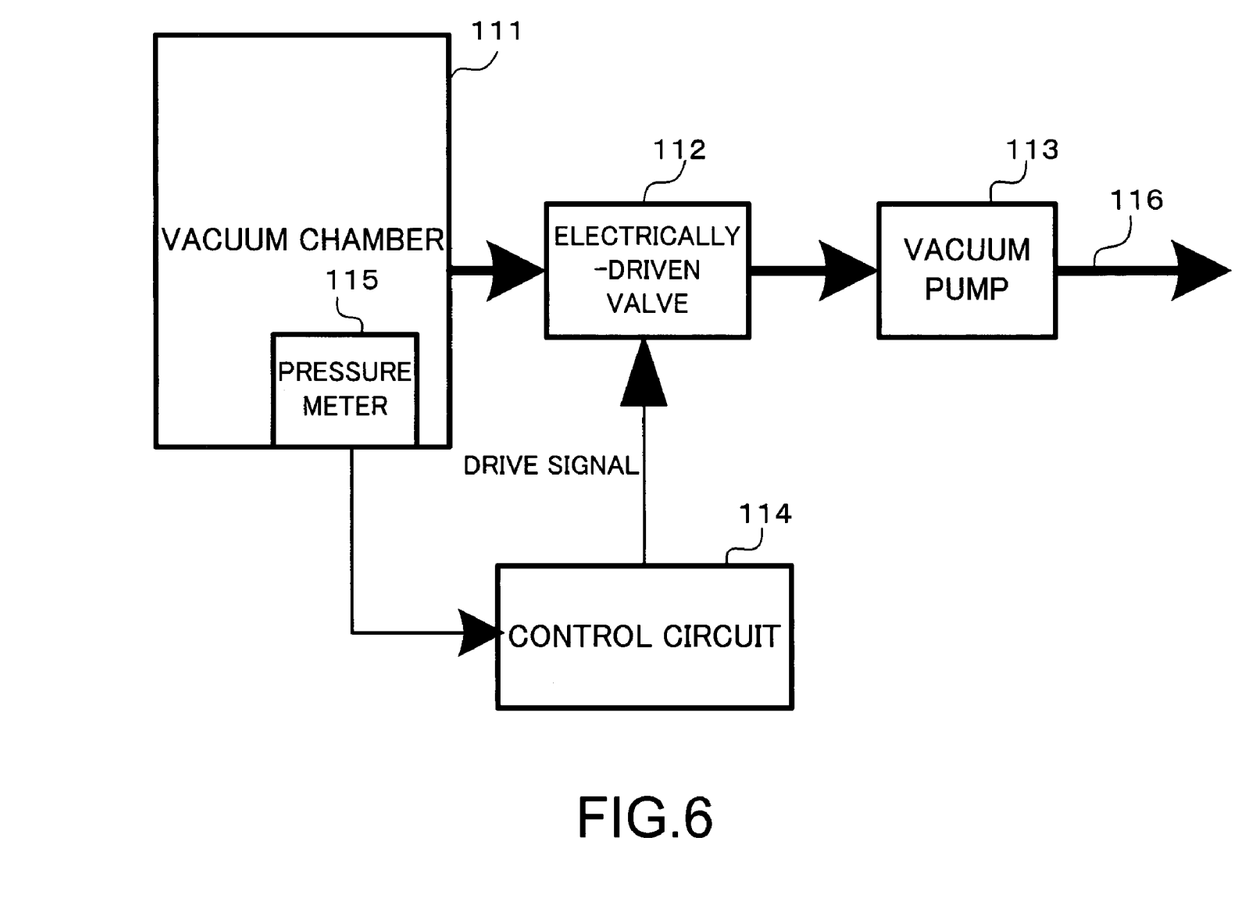
FIG. 6 is a block diagram of a vacuum system according to a yet another embodiment of the present invention.

Likewise, the present invention is applicable to a case where a vacuum chamber 111 is vacuumed by a vacuum pump 113 via a duct 16 as shown in FIG. 6. In this case, a pressure meter 115 is placed inside the vacuum chamber 111 to measure the pressure, and a control circuit 114 calculates the operation amount of an electrically-driven valve 112 based on the measured pressure and controls the opening degree of the electrically-driven valve 112 based on the calculated operation amount. In a case where the operation amount obtained by the control calculation exceeds the limit value of the drive velocity for the electrically-driven valve 112, the control circuit 114 controls the opening degree of the electrically-driven valve 112 by correcting the obtained operation amount so that the drive velocity will be equal to or smaller than the limit value.

In the above-described embodiment, the limiter process is performed for limiting the operation amount Vm so as not to exceed the maximum value of the driving capability of the operation object apparatus (pulse motor). However, the limiter value (correction value) may not only be the maximum value of the driving capability, but is arbitrary as long as such a value is not larger than the maximum value. For example, the limiter value Vlimit may be set to about 80% of the maximum driving capability value Vmax of the actuator. In this case, not whether it is |Vm|>Vmax but whether it is |Vm|>Vlimit is determined in step S17. And in step S19, with the use of Vlimit instead of Vmax, V0←V1+Vlimit (or a value smaller than Vlimit) is calculated. Likewise in step S20, V0←V1−Vlimit (or a value smaller than Vlimit) is calculated.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-082129 filed on Mar. 22, 2005 and including specification, claims, drawings and summary. The disclosure of the above Japanese Patent Application is incorporated herein by reference in its entirety.

What is claimed is:

1. A valve control system for controlling a variable opening valve maintainable in a plurality of opening degrees between a fully open position and a fully closed position, said system comprising:

a sensor which detects a control amount;

a control unit which calculates a variation between the control amount and an aimed value for the control amount based on an output of said sensor, calculates an operation amount for actuating said valve as a control object based on the calculated variation, corrects the calculated operation amount to a predetermined value equal to or smaller than a predetermined limit value in a case where the operation amount exceeds the limit value, and outputs the calculated operation amount or the corrected operation amount; and an actuator operably communicated with said valve to control the opening degree of said valve in accordance with the operation amount output from said control unit; wherein said actuator comprises a pulse motor; and said control unit calculates a number of pulses as pulse signals to be supplied to said pulse motor based on the variation, and limits the number of pulses to be supplied to a predetermined value equal to or smaller than a maximum number of pulses that can be responded to by said pulse motor in one period, in a case where the number of pulses to be supplied is larger than the maximum number of pulses.

2. The valve control system according to claim 1, comprising a refrigeration cycle which is connected to said valve, and which includes an evaporator through which a refrigerant circulates, wherein:

said sensor includes a first detector which outputs a signal corresponding to a temperature of the refrigerant at an entrance of said evaporator, and a second detector which outputs a signal corresponding to a temperature of the refrigerant at an exit of said evaporator; and said control unit comprises a unit which calculates a temperature difference between the temperatures of the refrigerant at the entrance and exit of said evaporator based on the signals from said first and second detectors, calculates a variation between the temperature difference and a set degree of superheat as an aimed value for the temperature difference, calculates an operation amount of said actuator based on the variation, corrects the calculated operation amount to equal to or smaller than a limit value which is equal to or smaller than a maximum operation capability amount representing a maximum amount by which said actuator can be operated in a predetermined period of time in a case where the operation amount is larger than the limit value, and outputs a signal corresponding to the corrected operation amount to said actuator.

3. The valve control system according to claim 1, wherein said control unit periodically calculates the variation between the control amount and the aimed value for the control amount, periodically calculates the operation amount of said actuator based on the variation, and limits the operation amount to a predetermined value equal to or smaller than a maximum amount by which said actuator can be operated in one period, in a case where the operation amount is larger than the maximum amount.

4. A valve control method for controlling a variable opening valve maintainable in a plurality of opening degrees between a fully open position and a fully closed position with a pulse motor, said method comprising:

a step of detecting a control amount;

a step of calculating a variation between the control amount and an aimed value for the control amount based on the detected control amount, and calculating an opening degree of the valve based on the calculated variation;

a step of calculating a number of pulses as pulse signals to be supplied to the pulse motor based on the variation;

a step of limiting the number of pulses to be supplied to a predetermined value equal to or smaller than a maximum number of pulses that can be responded to by the pulse motor in one period, in a case where the number of pulses to be supplied is larger than the maximum number of pulses; and a step of electrically supplying the pulse signals from a control unit to the pulse motor thereby controlling the opening degree of the valve by the number of pulses.

5. The valve control method according to claim 4, wherein the variation between the control amount and the aimed value for the control amount is periodically calculated, the number of pulses to be supplied to the step motor is periodically calculated based on the variation.

* * * * *

UNITED STATES PATENT AND TRADEMARK OFFICE
CERTIFICATE OF CORRECTION

PATENT NO. : 7,762,094 B2
APPLICATION NO. : 11/378044
DATED : July 27, 2010
INVENTOR(S) : Izumi Iwaki et al.

It is certified that error appears in the above-identified patent and that said Letters Patent is hereby corrected as shown below:

On the title page:

Item [73] Assignee: "Fujkoki Corporation, Tokyo (JP)" should read -- Fujikoki Corporation, Tokyo (JP) --.

Signed and Sealed this

Twenty-first Day of December, 2010

David J. Kappos
*Director of the United States Patent and Trademark Office*